United States Patent [19]

Eriksson et al.

[11] 4,003,055
[45] Jan. 11, 1977

[54] RADAR FUNCTION TESTING APPARATUS

[75] Inventors: Nils Tage Eriksson, Molnlycke; Rune William Jacobsson, Goteborg; Ingvar Georg Sundström, Molnlycke, all of Sweden

[73] Assignee: Telefonaktiebolaget L M Ericsson, Stockholm, Sweden

[22] Filed: Oct. 20, 1975

[21] Appl. No.: 623,666

[30] Foreign Application Priority Data

Nov. 6, 1974 Sweden .................... 7413918

[52] U.S. Cl. .................... 343/17.7; 343/760
[51] Int. Cl.² .................... H01Q 3/02; G01S 7/40
[58] Field of Search ............... 343/17.7, 703, 760, 343/894

[56] References Cited

UNITED STATES PATENTS 3,158,861  11/1964  Iribe .................... 343/17.7

*Primary Examiner*—Eli Lieberman
*Attorney, Agent, or Firm*—Hane, Sullivan & Spiecens

[57] ABSTRACT

A radar function testing apparatus for simulating a real radar target includes a transmission path between the movable and the fixed portion of the radar antenna in a radar equipment. A radiation energy source in the form of a light emitting element is mounted on, for example, the movable part and a radiation receiver in the form of a light sensitive element is mounted, for example on the stationary part. The light sensitive element consists of a photo detector which in dependence on the direction of the impinging radiation beam emits a number of signals which in known manner are treated so as to create signals which imitate the signals which would be obtained from a real target.

7 Claims, 12 Drawing Figures

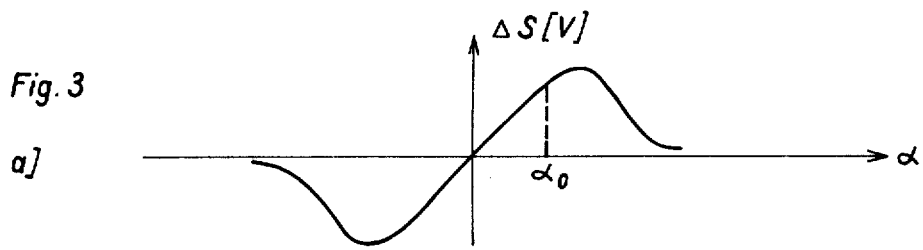
Fig. 3 a]
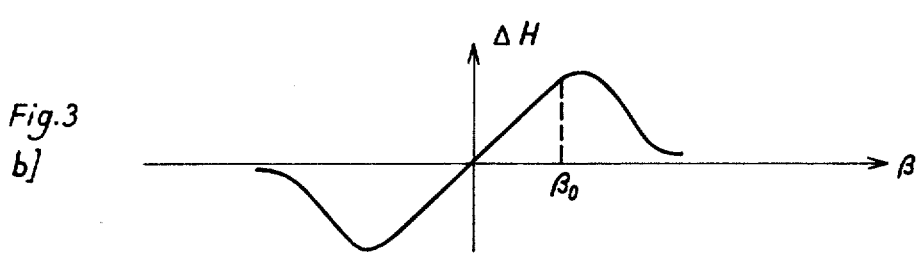
Fig. 3 b]
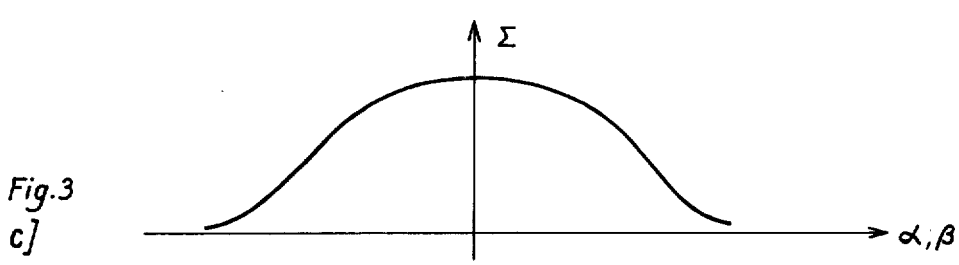
Fig. 3 c]
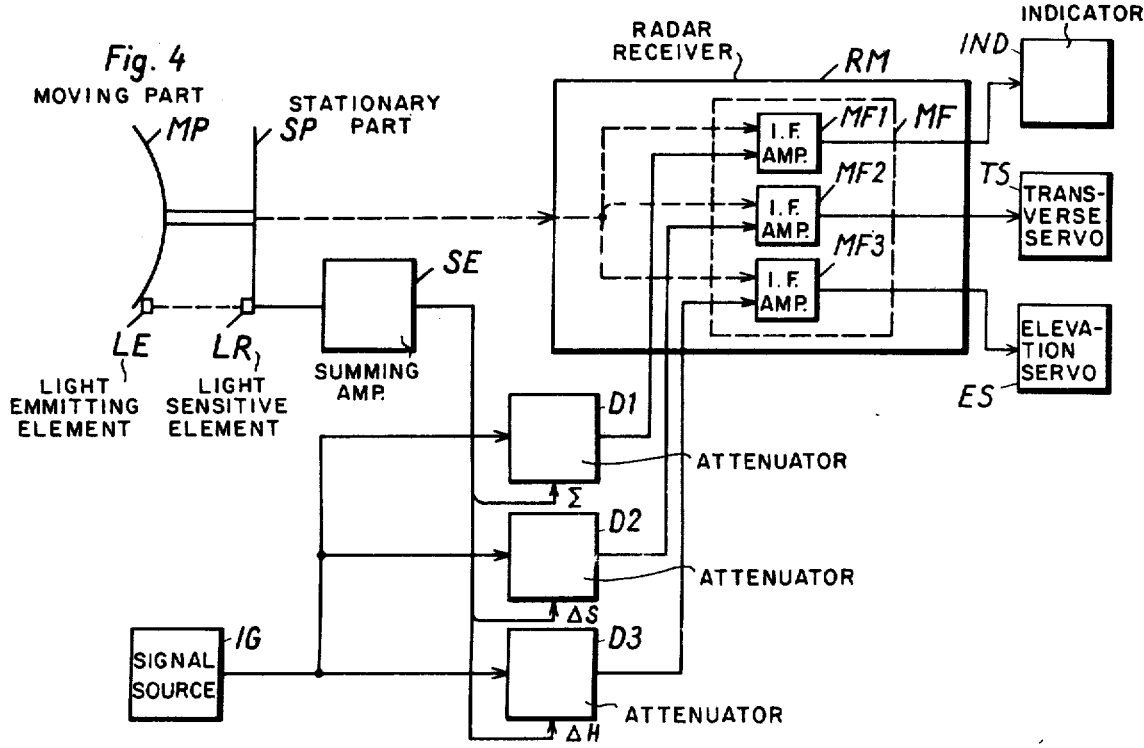

RADAR FUNCTION TESTING APPARATUS

The present invention relates to an apparatus for testing different functions in a radar equipment as, for example, the accuracy of the angular position when tracking a radar target and the detecting sensitivity upon reconnaissance of the target.

For radar equipments of different kinds it is desired to obtain a high availability, meaning on the one hand that the equipment is reliable in operation, i.e. has a long mean time between faults, and on the other hand that, upon malfunction, information about the fault is rapidly presented so that repair measures can be made.

In practice it has turned up that radar equipments may have been operating for a long time with strongly reduced efficiency because of faults in the equipment which the radar operator has not observed. It is previously known that in order, for example, to control the tracking function of an automatically tracking radar equipment to use complicated target simulators which, in order to be in the telefield of the radar are placed at a relatively far distance from the radar antenna. In such a previously known arrangement for function control, an antenna is placed at a certain distance from the radar antenna and in a known direction relative thereto. The antenna is supplied with a microwave signal which can be pulse modulated with a pulse from the synchronizing pulse generator of the radar receiver. The emitted radiation from the antenna then represents a test signal which simulates a radar signal (an echo) from a radar target in a known direction. By letting the radar device operate in a normal manner toward the simulating target, different types of tests can be carried out which give information about the efficiency of the equipment. A disadvantage of the above mentioned radar target simulator is that it is complicated and difficult to use and, since it cannot be built into the radar equipment, it will be seldom used increasing the risk that a malfunctioning radar equipment will be used.

An object of the present invention is to provide an apparatus for testing different functions in a radar equipment. Another object is to provide means for a simple and a reliable simulation of a radar target.

Upon use of the invention the following advantages are readily achieved using conventional techniques.

The necessary arrangements for simulating a radar target is fixedly placed on or in the radar equipment and any loosely mounted equipment is not needed.

The apparatus is fixedly mounted, needs only small extra space, and is therefore suitable for, for example, a radar equipment in an aircraft.

No microwave radiation is utilized and therefore any objects is the surroundings of the equipment do not influence the accuracy of the test.

Necessary adjustments are carried out only once in connection with the manufacture of the apparatus.

The invention, the characteristics of which appear from the appended claims, will be explained more fully with reference to the accompanying drawings in which:

FIGS. 1a, 1b and 1c show a radar antenna with a fixed and a movable part to which one part of the arrangement according to the present invention is applied, wherein FIG. 1a and 1b are top views of the antenna and FIG. 1c is a side view of the antenna;

Figure 2:
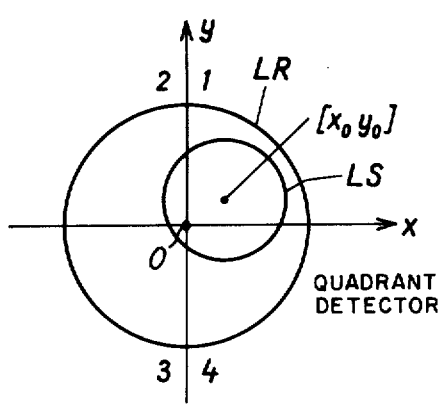
Figure 5:
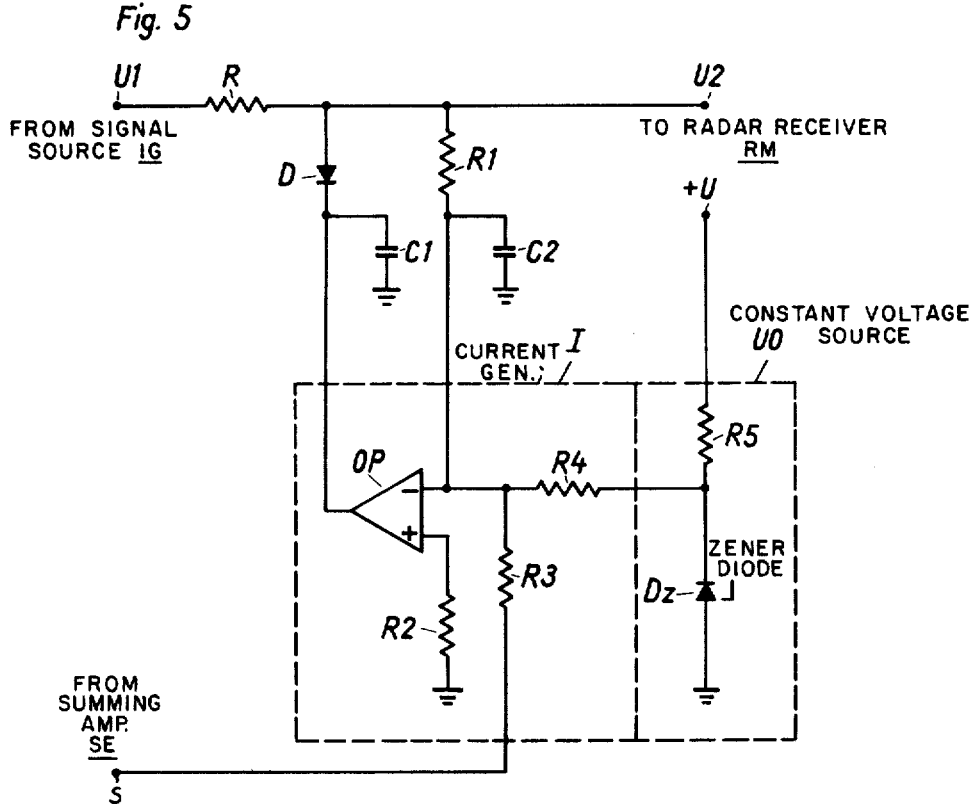
Figure 6:
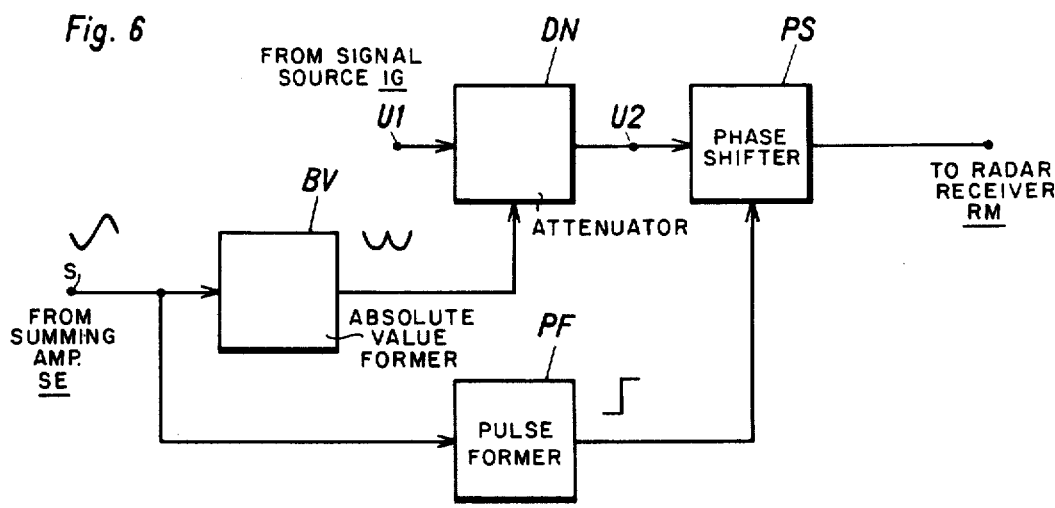

FIG. 2 schematicaly in orthogonal co-ordinate system shows a so caled quadrant detector which is included as a part in the apparatus according to the present invention;

FIGS. 3 a–c show the wave forms of the signals received from a summing amplifier unit which receives signals from the detector according to FIG. 2;

FIG. 4 shows a block diagram of the apparatus according to the invention connected to a radar receiver of a certain type;

FIG. 5 shows a circuit diagram of an attenuator circuit which is included as a part in the apparatus according to the invention; and FIG. 6 shows a block diagram of an attenuator device in which the attenuation circuit according to FIG. 5 is included as a part.

The embodiment of the arrangement according to the present invention described in the following relates to a radar equipment of the monopulse type but it is understood that the principle of the invention also can be applied to other types of radar equipments.

Figures 1A, 1B, 1C:
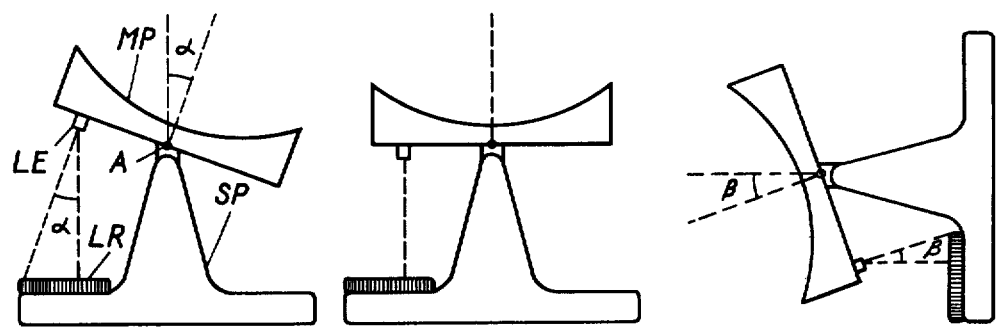

FIGS. 1 a–c show schematically a radar antenna unit of the monopulse type consisting of a movable part MP and a fixed part SP. The movable part can as known be moved around its axis which has been symbolized by a point A. FIG. 1 a shows the antenna from above with the movable part MP aimed in a directin making an angle $\alpha$ relative to the direction towards an imaginary target. FIG. 1b is again a top view now showing the antenna directed towards the imaginary target, and FIG. 1c shows the antenna seen from the side aimed in a direction making an angle $\beta$ to the target direction. For the sake of simplicity the target direction has been chosen perpendicular to the plane surface of the antenna but it is understood that other directions of the target are also possible. The angles $\alpha$ and $\beta$ thus indicate rotations in the transverse and in the elevation direction, respectively and represent thereby a deviation of the axis of the radar antenna relative to the target direction. For normal use of radar equipment this gives in known manner rise to error signals in the radar receiver.

Figure 1D:
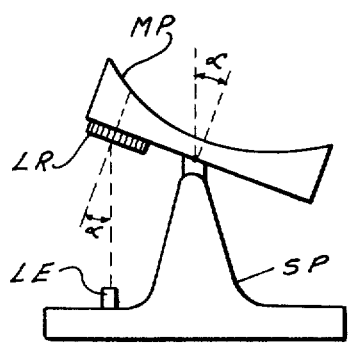
FIGS. 1d and 1e are top views of antennas similar to those of FIGS. 1a to 1c with different positionings of a light emitting and light sensitive element.
Figure 1E:
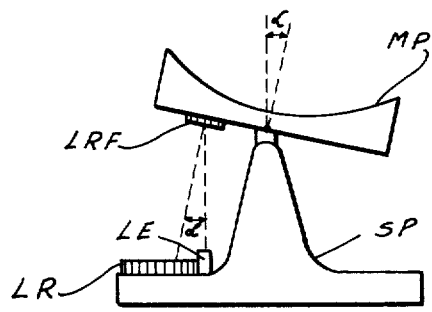

According to the gist of the invention and in order to simulate a certain target with a certain given direction, a transmission path has been provided between the movable part MP and the fixed part SP of the antenna. This path in the shown examples according to FIGS. 1a, 1b and 1c are constituted by a source of radiant energy in the form of a light emitting element LE applied to the movable part MP and a radiation receiver in the form of a light sensitive element LR applied to the fixed part SP. Other embodiments of such transmission path are also possible. For example, the light emitting and the light sensitive elements LE and LR, repectively, can be interchanged as shown in FIG. 1d or the light emitting and the light sensitive elements can be placed near each other on one part of the antenna unit and the transmission can occur via a mirror LRF on the other part of the antenna unit as shown in FIG. 1e. Both visible light and infra-red radiation can be utilized. As a light sensitive element in the embodiment according to FIGS. 1a–c, for example, a so-called quadrant detector is used whose function will be explained more in detail in connection with FIG. 2. Such a type of detector is publicly known, for example, EG & G type SGD-444-4. The quadrant detector consists of a sensitive photo detector made of silicon and of circular design which delivers four output signals having magnitudes which are dependent on the position of the centre point of a light spot impinging on the detector. The diameter of the light spot should then be chosen equal to or greater than the radius of the detector. Also other detectors, for example, position sensitive photo detectors of the type which is described in the Swedish Patent No. 368.741 can be used.

FIG. 2 shows schematically a quadrant detector inserted into a right-angled co-ordinate system x - y with origin o. The four quadrants of the detector LR are denoted by reference numerals 1–4. The incident light beam to the detector from the light emitting element LE gives a circular light spot LS, the centre of which occupies certain position (xo, yo) on the surface of the detector. The plane of the detector is then perpendicular to the direction of the imaginary target. From each quadrant 1–4 a signal $s1$, $s2$, $s3$ and $s4$, respectively, is obtained the magnitude of which is dependent of the size of the illuminated surface and of the intensity. In the normal position when the antenna perfectly follows the target ($\alpha = \beta = O$) signals $s1$, $s2$, $s3$, $s4$ having the same magnitude are obtained. These signals can be added in known manner in order to obtain a resulting summation signal $\Sigma$, which constitutes the reference signal. When the antenna axis deviates from the target direction by an angle $\alpha$ in the transverse or by an angle $\beta$ in the elevation direction according to the FIGS. 1a and 1c, the quadrants will be differently illuminated. For a transverse deviation, see FIG. 1a, the signal $s1 + s4$ will be greater than the signal $s2 + s3$. For a deviation in the elevation direction, see FIG. 1c, the summation signal $s1 + s2$ will instead be greater than $s3 + s4$.

FIG. 3a and 3b show for a certain simulated target the characteristics of the signals obtained from the quadrant detector after summation as a function of the deviation between the target direction and the direction of the antenna axis. The light spot LS impinging against the detector LR is then assumed to be centered around the point with the co-ordinates (xo, yo) in FIG. 2, when the transverse direction and the elevation direction of the deviate antenna by angles $\alpha_o$ and $\beta_o$, respectively from the target direction. In FIG. 3a $\Delta$ S indicates the difference $(s1 + s4) - (s2 + s3)$ of the summation signals and in FIG. 3b $\Delta$H indicates the difference $(s1 + s2) - (s3 + s4)$. By means of the signal $s1, s2, s3, s4$ a resulting signal $\Sigma = s1 + s2 + s3 + s4$ can be formed, the characteristics of which is shown in FIG. 3c. The characteristics of the signals $\Delta S$, $\Delta H$ and $\Sigma$ coincide with the signals from a radar receiver with monopulse function, compare, for example, Barton "Radar System Analysis", 1964, pages 270–273.

FIG. 4 shows schematically the apparatus according to the present invention and its connection to a radar receiver. As in FIG. 1, MP and Sp denote the movable and the fixed part, respectively of the antenna unit on which the light emitting element LE and the light sensitive element LR are arranged. The signals $s1, s2, s3, s4$ generated in the light sensitive element LR are supplied to a summing amplifier unit SE, which produces the signals $\Delta S$, $\Delta H$ and $\Sigma$ and amplifies the same. The amplifier unit SE delivers these signals as control signals via three different connections to the controllable atenuator devices D1, D2 and D3. Each attenuator device has an input connected to a signal source IG and an output connected to its respective intermediate frequency amplifier MF included in the radar receiver RM. The signal source IG is suitably constituted by an intermediate frequency generator for delivering a sinusoidal intermediate frequency signal which is pulsed by a pulse formed signal within the low frequency range (magnitude kHz) and with variable amplitude in order to obtain the desired signal power. The signal source IG can also be constituted by a microwave oscillator, the attenuator device then being designed for microwave frequencies and by means of directional couplers being connected to the signal mixer of the radar equipment. The attenuation of the frequency signal obtained from the signal source IG is dependent on the value of the signals $\Delta S$, $\Delta H$ and $\Sigma$ respectively. Furthermore, a negative value of the signals $\Delta S$ and $\Delta H$, respectively means that the intermediate frequency signal changes its phase and also that the attenuation is reduced when the absolute value of $\Delta S$, $\Delta H$ and $\Sigma$, respectively, is increased. Thus a good representation of the signals when occurs in actual use of the radar equipment is obtained.

There is shown in FIG. 5, a controllable attenuation circuit for the negative control signal which is included in each of the attenuator arrangements D1–D3 shown in FIG. 4. The attenuation circuit according to FIG. 5 includes a diode D as that attenuating element and exploits the principle that when the current through a diode is changed, then its differential resistance denoted by Rd is changed. More specifically, if the current through a diode is denoted by Id and the voltage drop across the same is denoted by Ud, the following is valid:

$$Rd = \frac{dUd}{dId} \qquad (1)$$

According to the diode equation, however, $$Id = Io\,(e^{qUd/kT} - 1) \ldots (2)$$

where $Io$, $q$ and $k$ are constants and $T$ the absolute temperature which in the present case is assumed to be constant. Differentiation of equation (2) gives $$\frac{dId}{dUd} = \frac{1}{Rd} = Io\left(\frac{q}{kT} e^{qUd/kT}\right) = \frac{q}{kT}(Id + Io) \qquad (3)$$

From the equation (3) it is realized that if the current through the diode increases, its resistance Rd will be reduced and vice versa. This condition is utilized in the attenuation circuit according to FIG. 5 wherein an input voltage U2 is to be attenuated and transmitted as an output voltage from the attenuation circuit. A control voltage U2 terminal $s$ receives a signal which controls the atenuation of the attenuation circuit. The diode D is connected in a shunt branch of the attenuation circuit and the resistor R is connected in series branch. In order to supply the diode D with a control current, a controllable current generator I is provided comprising the operational amplifier OP, the resistor R2 connected between the positive input of the amplifier and earth, the resistor R3 connected betwen the negative input and the control voltage terminal $s$ and a resistor R4. The output of the amplifier OP is connected to the diode D. The negative input of the amplifier OP is further via the resistor R4 connected to a constant voltage source Uo which comprises a zener diode Dz with associated resistor R5. The resistor R5 is then connected to a reference potential U. Hereby a constant current is fed to the diode D from the current generator I at zero control voltage across the terminal s. The capacitors C1 – C2 are filter capacitors in order to shunt the incoming high frequency signal U1 to ground.

Variation of the attenuation in the attenuation circuit occurs when the dynamic resistance Rd in the diode D is varied by means of the current from the associated current generator I. In the embodiment shown in FIG. 5 the control of the respective diode current and therewith attenuation occurs by means of a negative control voltage at terminal s, but, as it will be explained, control can also be carried out by means of a positive control voltage together with a phase shift of the incoming high frequency signal U1.

When the control voltage across the terminal s is zero, a current flows via the resistors R4 and R1 through the diode D. The resistance of this diode is then low. The constant and high resistance in the series branch and the low resistance in the shunt branch of the attenuation circuit implies that the total attenuation is high.

When the control voltage across the terminal s assumes a negative value, the current through the diode D and the resistor R1 is reduced and instead the current flows through the resistor R3 to the control voltage source (amplifier unit SE) connected to the terminal s. This implies that the resistance of the diode D increases. The result of the resistance change of the diode D is that the attenuation of the attenuation circuit is reduced.

From the above it is apparent that the attenuation circuit according to FIG. 5 is only intended for negative control voltages across its terminal s. According to FIG. 3a–c the signals ΔS, ΔH and Σ also assume positive values (relative to ground potential) and furthermore a phase shift of the incoming intermediate frequency signal to the attenuation circuit is obtained for a negative control voltage. The attenuation circuit according to FIG. 5 can also be used for this purpose and FIG. 6 shows a block diagram of one of the attenuator devices D1–D3 according to FIG. 4 which fulfils such conditions. By DN an attenuation circuit according to FIG. 5 is denoted which has an input for receiving the intermediate frequency signal as described in connection with FIG. 5. The output of the attenuation circuit DN is connected to a phase shifting circuit PS known per se. This is controlled via a pulse former PF by the control signals ΔS, ΔH supplied to the terminal s according, to FIG. 4. Since the control signal always has a constact sign, no phase shifting circuit in the associated attenuator device D3 is required. The control signals are supplied to an absolute value forming circuit BV, whereby the positive values in the control signals are phase shifted so that only negative signals are supplied to the attenuation circuit DN. The outgoing attenuated signal U2 from the attenuation circuit DN will be phase shifted or not phase shifted in the circuit PS in dependence on a negative or a positive level obtained from the pulse former PF. The output of the circuit PS is connected to the intermediate frequency amplifier MF included in the radar receiver as it appears from FIG. 4.

The intermediate frequency amplifier MF FIG. 4 is in known manner divided in three units MF1, MF2, MF3. The unit MF1 is connected to the output of the attenuator device D1 for amplification of the signal obtained therefrom and which is the same as the one emitted from the signal source IG but attenuated in dependence on the value of the summation signal Σ. When signal Σ assumes a high value the attenuation of the signal is low. Since this signal represents the simulated echo it is supplied to a presentation unit IND, for example, the indicator of the radar receiver.

In similar manner the outputs of the attenuator devices D2 and D3 are connected to the units MF2 and MF3 in the ordinary error signal channels of the receiver. The signals which appear across the inputs of the units MF2 and MF3, namely, correspond to the ordinary error signals in the transverse direction and in the elevation direction, respectively in the receiver. These two signals are supplied as control signals to the two servo systems represented by the blocks ES and TS for rotating the antenna is the elevation and in the transverse direction, respectively.

The dotted connections shown in FIG. 4 are intended to symbolize the normal signal path between the antenna and in this case the respective intermediate frequency amplifier in the receiver unit. These connections need not be disconnected when controlling the radar equipment. Since no real target is present when testing, this normal connection gives only rise to normal station noise in absence of a radar target.

We claim:

1. Apparatus for testing different functions in a radar equipment comprising:
    an antenna unit having a movable part and a fixed part;
    a receiver unit for said antenna unit;
    a source of radiation energy and a radiation receiver;
    means for providing a directed transmission of radiation energy between said parts of the antenna unit in dependence on the position of said movable part relative to the position of said fixed part;
    means included in said radiation receiver for generating three different signals in dependence on the deviation of the direction of the radiant energy from a fictitious target direction corresponding to a certain target position, said signals consisting of a first signal whose amplitude varies with the received energy, a second signal which varies with the position of the radiation beam center relative to a symmetry axis, and a third signal which varies with the position of the beam center relative to another symmetry axis perpendicular to said symmetry axis;
    a signal source for generating pulsed signals; and
    attenuating means controlled by said first, second and third signals, for generating from said pulsed signals three different output signals which are fed to said receiver unit, said output signals corresponding to the target signals which would be obtained from a real radar target.

2. Apparatus according to claim 1, wherein said source of radiation energy is arranged on the movable part of the antenna unit and wherein said radiation receiver is arranged on the fixed part of said antenna unit.

3. Apparatus according to claim 1, wherein said source of radiation energy is arranged on the fixed part of the antenna unit and wherein said radiation receiver is arranged on the movable part.

4. Apparatus according to claim 1, wherein both said source of radiation energy and said radiation receiver are arranged on the fixed part of the antenna unit and wherein a radiation reflecting element is arranged or the movable part.

5. Apparatus according to claim 1, wherein said signal source emits pulsed signals in the intermediate frequency range and is connected to the control input of each of said attenuation means, each output of said attenuation means being connected to the respective input of the intermediate frequency unit in the receiver unit.

6. Apparatus according to claim 1, wherein said signal source emits signals within the microwave range, said attenuation means being connected to a signal mixer in the receiver unit.

7. Apparatus according to claim 1 wherein the plane formed by said two symmetry axes is normal to the fictitious direction.

* * * * *